United States Patent
LaForest et al.

(10) Patent No.: US 7,430,350 B1
(45) Date of Patent: Sep. 30, 2008

(54) MULTI-LENGTH FLEXIBLE IMAGE BUNDLE

(75) Inventors: Michael F. LaForest, Sturbridge, MA (US); Ahmet Kucuk, Sunnyvale, CA (US)

(73) Assignee: Karl Storz Endovision, Inc., Charlton, MA (US)

(*) Notice: Subject to any disclaimer, the term of this patent is extended or adjusted under 35 U.S.C. 154(b) by 0 days.

(21) Appl. No.: 11/735,573

(22) Filed: Apr. 16, 2007

(51) Int. Cl.
*G02B 6/06* (2006.01)
*C03B 37/01* (2006.01)

(52) U.S. Cl. ............ 385/117; 385/116; 65/408

(58) Field of Classification Search .......... None
See application file for complete search history.

(56) References Cited

U.S. PATENT DOCUMENTS

| | | | |
|---|---|---|---|
| 3,599,679 A | 8/1971 | Carter | 139/420 |
| 3,819,442 A | 6/1974 | Brushenko | 156/180 |
| 3,830,667 A * | 8/1974 | Carpenter | 156/155 |
| 4,021,217 A * | 5/1977 | Bondybey et al. | 65/378 |
| 4,198,977 A | 4/1980 | Aoki | 433/136 |
| 4,349,497 A | 9/1982 | Blackington | 264/1.5 |
| 4,802,461 A | 2/1989 | Cho | 128/7 |
| 4,813,400 A | 3/1989 | Washizuka et al. | 128/6 |
| 4,848,868 A * | 7/1989 | Rohner | 385/114 |
| 4,871,229 A | 10/1989 | Tashiro | 350/96.26 |
| 5,199,417 A | 4/1993 | Muller et al. | 128/6 |
| 5,217,002 A | 6/1993 | Katsurada et al. | 128/4 |
| 5,456,245 A | 10/1995 | Bornhop et al. | 600/139 |
| 7,308,177 B1 * | 12/2007 | Raszka et al. | 385/116 |

* cited by examiner

*Primary Examiner*—Hemang Sanghavi
*Assistant Examiner*—Omar Rojas
(74) *Attorney, Agent, or Firm*—St. Onge Steward Johnston & Reens LLC

(57) ABSTRACT

A method for manufacturing an image fiber bundle that includes the steps of aligning a plurality of image fibers into a bundle, bonding the plurality of image fibers in at least three regions to form an image fiber bundle with a useable length and at least one useable sub-length, and inspecting the image fiber bundle for defective image fibers. The image fiber bundle includes flexible regions disposed between the bonded regions and the spacing of the bonded regions corresponds to a plurality of standardized lengths for fiberscopes.

24 Claims, 6 Drawing Sheets

2(d) → Rinse With Water 2(e) → Immerse in Solvent 2(f) → Rinse With Water 2(g) → Inspect For Defects 2(h)

Fig. 4B

MULTI-LENGTH FLEXIBLE IMAGE BUNDLE

FIELD OF THE INVENTION

This invention relates to fiberscopes, in particularly to methods for manufacturing the fiber optic bundles utilized in fiberscopes.

BACKGROUND OF THE INVENTION

In medical and industrial flexible fiberscopes, an image is transmitted using a bundle of coherently aligned optical fibers, which form a fiber bundle. The number of fibers in a fiber bundle varies from 1000 to 50,000 depending on the application and the size of the bundle. Each fiber, which can represent a pixel, transmits a small portion of the image, and the combination of the images from each fiber generates the whole image. To do so, coherent alignment of fibers in the fiber bundle is required in the distal and proximal ends of the bundle in order to correctly transmit the image from one end to other end. The distal end corresponds to the end where the image is located and the proximal end corresponds to the end where the image is observed.

FIG. 1 is a depiction of a fiber bundle 100 with a proximal end 101, a distal end 102, and a transition region 103 spanning the proximal and distal ends. Fiber bundle 100 comprises a plurality of fibers 104-110 that are coherently aligned. Coherent alignment means that the position of a fiber relative to all other fibers at one end should be the same as the other end. As such, the measured distances separating the center points of each fiber relative to all other fibers will be the same at the proximal and distal ends of the fiber bundle. For optical fibers, while it is possible to have coherently aligned fibers spanning the entire length of the fiber bundle, it is acceptable to have non-coherently aligned fibers in transition region 103.

For fiberscopes, the image fiber bundle needs to be flexible (i.e. bendable) between distal and proximal ends so that a flexible fiberscope can be bent to enable observation through curved openings or channels. It is well known that fiber can be bent to certain bend radiuses before breakage. When a glass fiber is bent, a tensile stretching force is created in the fiber that is inversely proportional with the bending radius of the fiber. If the tensile force is larger that the tensile strength of the fiber, the fiber will break. A broken fiber means a dark spot in a transmitted image. Typically, a glass fiber will be broken when it is bent to a bending radius of 100-500 times its own radius. Therefore, the smaller the fiber diameter the smaller bending radius that can be achieved.

In order to achieve the objectives of coherently aligned fibers and fiber diameters that are small enough to be able to bend the fiberscope without breaking the fiber, etchable fiber bundles have been utilized. FIGS. 2A-2E depicts the method by which etchable fiber bundles 150 are formed. At step 1(a), individual fibers 151 are brought together to form a bundle with a proximal end 152, a distal end 153 and a transition region 154. The fibers 151 are at least coherently aligned at the proximal 152 and distal 153 ends. At step 1(b), the fibers 151 are coated with an acid soluble glass 155 and baked so that fiber bundle 150 is rigid and the individual fibers 151 are thermally bonded together. At step 1(c), the proximal 152 and distal 153 ends of bundle 150 are covered with an acid resistant coating 156 that will protect these thermally bonded ends from acid. At step 1(d) the bundle is put into an acid bath to dissolve the glass 155 in the transition region 154. The proximal 152 and distal 153 ends of bundle 150 are protected by the acid resistant coating 156. At step 1(e), the acid resistant coating 156 is stripped away with a solvent. The result of this process is a fiber bundle 150 with rigid ends 152, 153 of coherently aligned fibers 151 and a flexible portion over the entire transition region 154 between the ends with independent individual fibers. The ridged ends provide the coherency while separated fibers provide the flexibility (ie. bendability).

Fiberscopes are known to be manufactured to different lengths and utilize fibers of different diameters. Typically, individual fibers have a diameter from 5 to 15 micrometers. The fiber bundles, which could have 1,000 to 50,000 fibers, are typically 0.2 mm to 2 mm, depending on the application.

One problem with image fiber bundle manufacturing techniques is the relatively high production cost and relatively low process yield. Image fibers are brittle and susceptible to breaking during the manufacturing process. An acceptable fiberscope should not have more than two broken fibers in the central area of a fiber bundle because a broken fiber will not transmit an image, but will be seen as a dark spot in the view. Given the number of fibers in a bundle (1,000 to 50,000), the length of the bundle (from 100 mm to 3000 mm) and small size of a fiber (from 5 micrometers to 15 micrometers), it is very challenging to manufacture a fiber scope with no broken fibers. For example, a 1.0 mm fiber bundle with 200 mm length and 20,000 fibers will be scrapped at the end of a manufacturing process if it is found that it has more than 2 broken fibers (i.e. less than 0.01% of the fibers are broken). Giving the probability of high scrap rates, keeping the manufacturing cost of fiberscopes down and delivering fiberscopes in a timely manner can be challenging.

What is needed is a fiberscope that can be manufactured at a reduced cost. It would be beneficial if such a fiberscope can be manufactured utilizing a process that minimizes the scrap rate or increases the process yield of a fiber bundle. It would also be beneficial if such a process also minimized the cost associated with scraping a fiber bundle.

SUMMARY OF THE INVENTION

These objectives are achieved by a method for manufacturing an image fiber bundle that includes the steps of aligning a plurality of image fibers in to a bundle, bonding the plurality of image fibers in at least three regions to form an image fiber bundle with a useable length and at least one useable sub-length, and inspecting the image fiber bundle for defective image fibers. The method also includes the steps of identifying at least one useable sub-length between the at least three bonded regions that comprises an acceptable number of defects, and separating the at least one useable sub-length from the image fiber bundle.

It is another aspect of the invention for the image fibers to be coherently aligned in the at least three bonded regions.

It is yet another aspect for the step of separating at least one useable sub-length to include the step of cutting the image fiber bundle in at least one of the at least three bonded regions.

It is a further aspect for the method to include the step of constructing a fiberscope with the at least one useable sub-length.

It is yet another aspect to provide for an image fiber bundle that includes a plurality of aligned image fibers, at least three bonded regions that bond the aligned image fibers, and flexible regions disposed between the bonded regions. The spacing of the bonded regions corresponds to a plurality of standardized lengths for fiberscopes.

It is still a further aspect of the invention for the bonded regions to be formed at the proximal end of the image fiber bundle, the distal end of the image fiber bundle, and an intermediate point disposed between the proximal end and the distal end. The distance from the proximal end to the distal end corresponds to a first fiberscope standardized length and the distance from the proximal end to the intermediate point corresponds to a second fiberscope standardized length. The plurality of aligned image fibers are rigidly bonded in the at least three bonded regions. The flexible regions comprise a plurality of independent image fibers that are not bonded.

Other aspects of the invention and its particular features and advantages will become more apparent from consideration of the following drawings and accompanying detailed description.

BRIEF DESCRIPTION OF THE DRAWINGS

FIG. 4B is a depiction of a flow chart illustrating a second portion of the method of FIGS. 3A-3E.

DETAILED DESCRIPTION OF THE INVENTION

Figure 1:
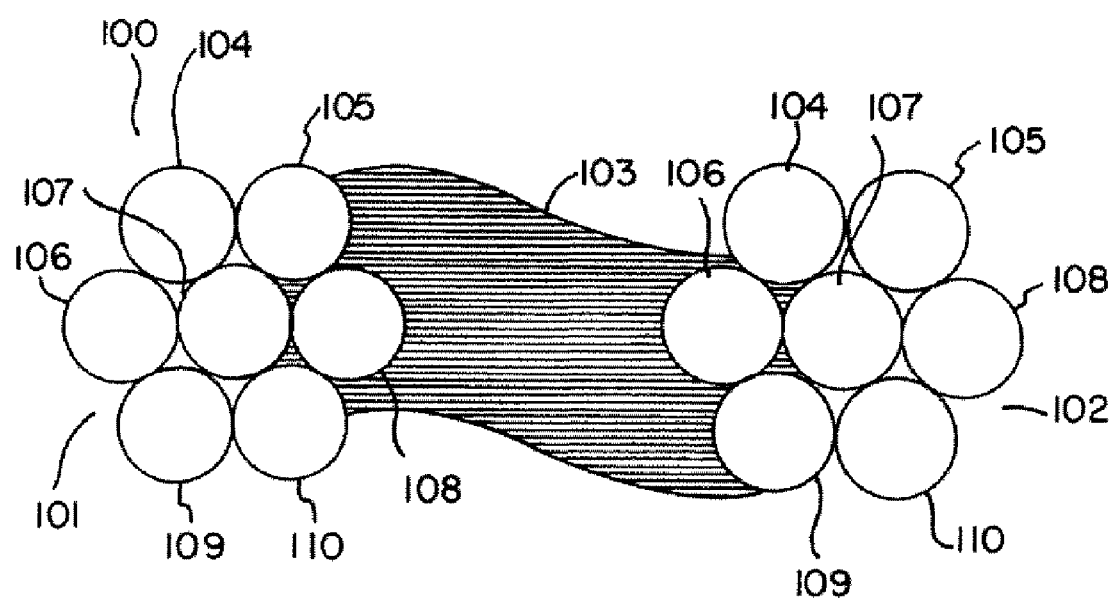
FIG. 1 is a depiction of the proximal and distal ends of an image fiber bundle.
Figure 2A:
FIG. 2A is a depiction of a step to manufacture an image fiber bundle.
Figure 2B:
FIG. 2B is a depiction of a second step to manufacture an image fiber bundle.
Figure 2C:
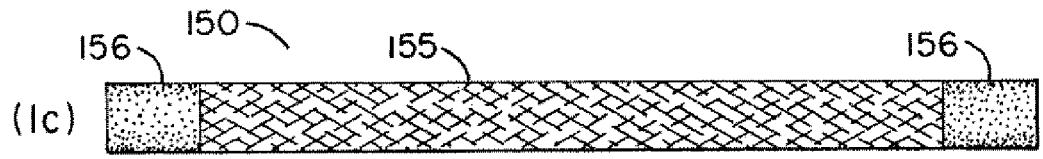
FIG. 2C is a depiction of a third step to manufacture an image fiber bundle.
Figure 2D:
FIG. 2D is a depiction of a fourth step to manufacture an image fiber bundle.
Figure 2E:
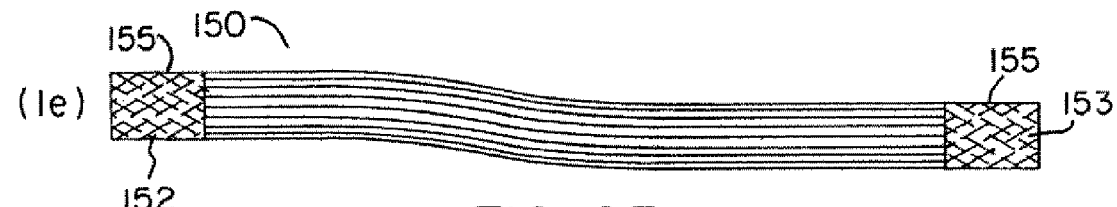
FIG. 2E is a depiction of a fifth step to manufacture an image fiber bundle.
Figure 3A:
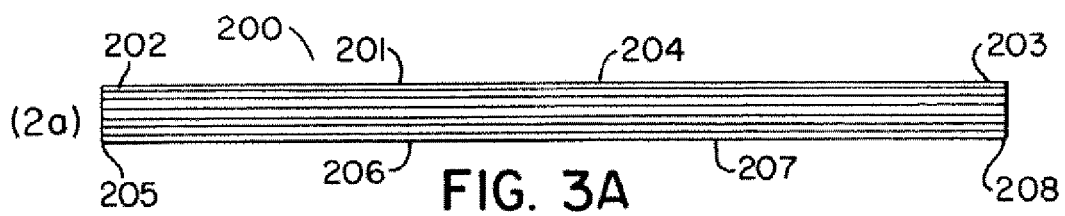
FIG. 3A is a depiction of a step of the present invention to manufacture an image fiber bundle.
Figure 3B:
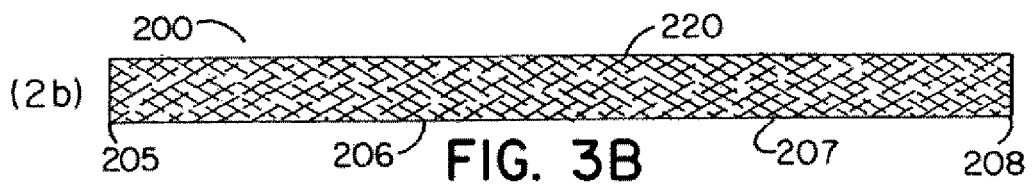
FIG. 3B is a depiction of a second step of the present invention to manufacture an image fiber bundle.
Figure 3C:
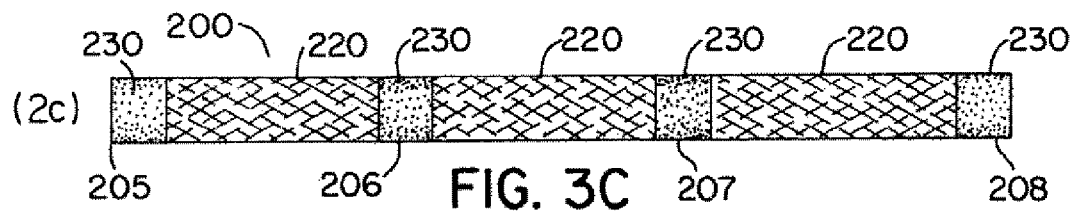
FIG. 3C is a depiction of a third step of the present invention to manufacture an image fiber bundle.
Figure 3D:
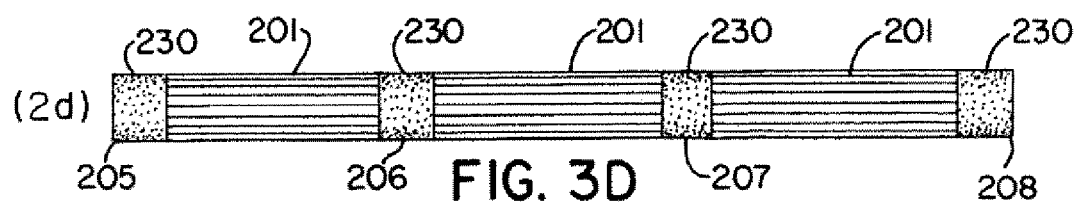
FIG. 3D is a depiction of a fourth step of the present invention to manufacture an image fiber bundle.
Figure 3E:
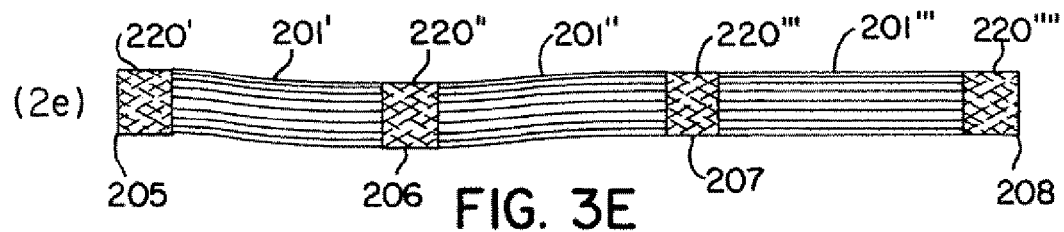
FIG. 3E is a depiction of a fifth step of the present invention to manufacture an image fiber bundle.
Figure 4A:
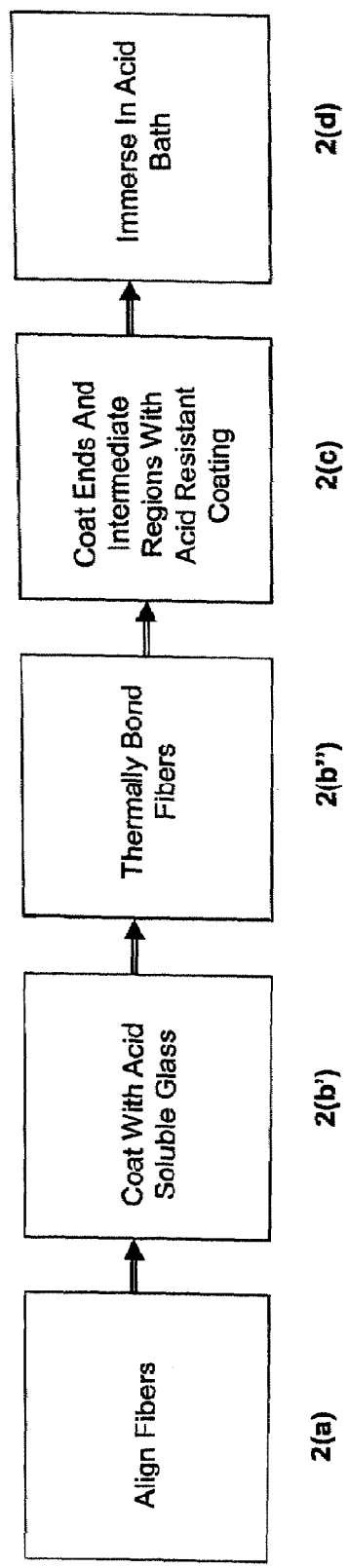
FIG. 4A is a depiction of a flow chart illustrating a first portion of the method of FIGS. 3A-3E.
Figure 4C:
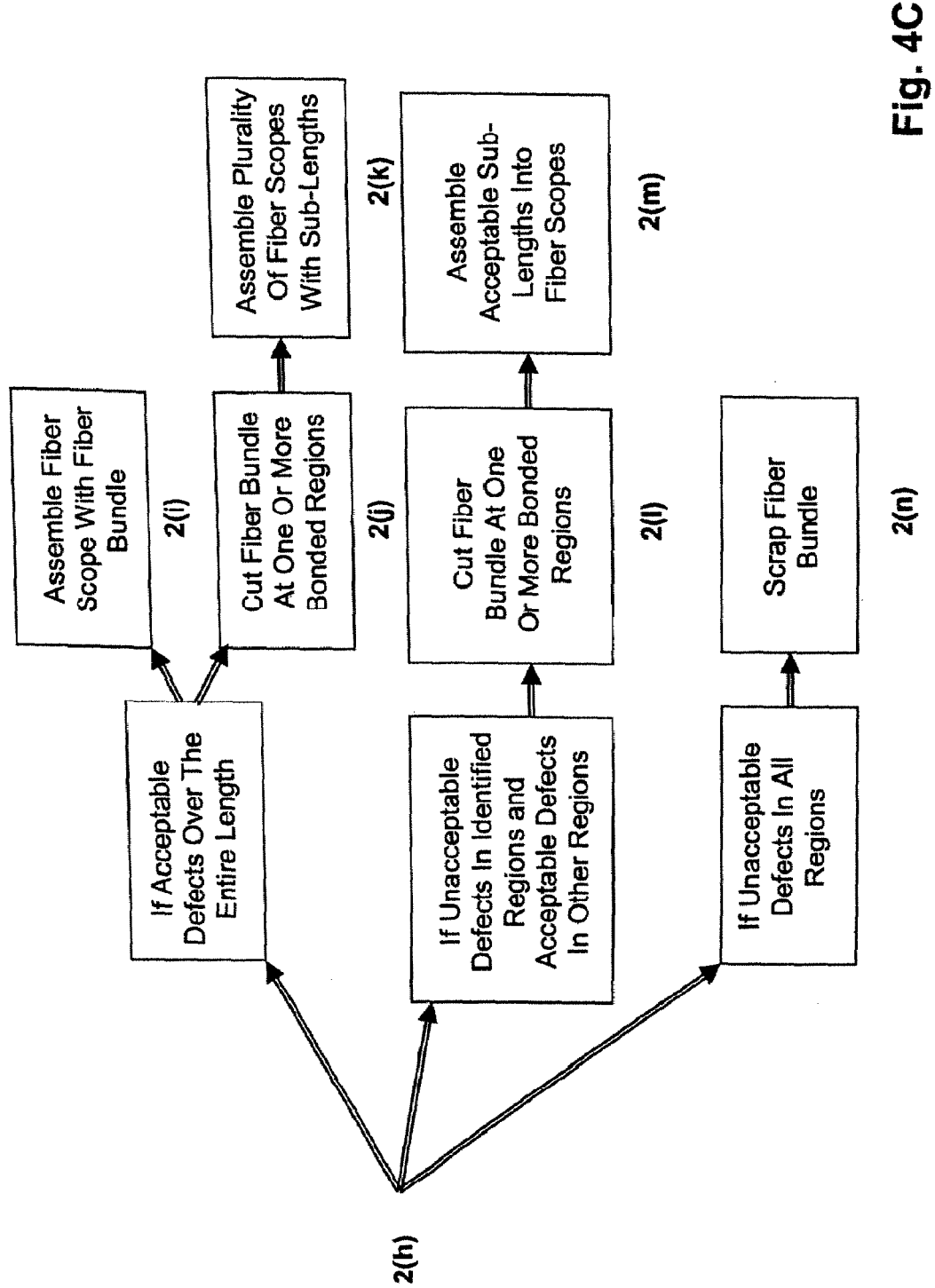
FIG. 4C is a depiction of a flow chart illustrating a second portion of the method of FIGS. 3A-3E.

FIGS. 3A-3E and 4A-C depict a process of manufacturing image fiber bundle 200 for a plurality of fiber scopes of different lengths. At step 2(a), individual fibers 201 are brought together to form a bundle with a proximal end 202, a distal end 203 and a transition region 204. It is also possible to identify within fiber bundle 200 several points 205-208. The individual fibers 201 are coherently aligned at least at each of these points 205-208. As such, it is possible for the fibers to be coherently aligned at points 205-208 and not coherently aligned in the areas between these regions.

Each point 205-208 or summation of points can correspond to a useable fiberscope length, such as different standardized fiberscope lengths. Such standardized fiberscope lengths can come from industry standard lengths or length variations in a company's product line. The distance between points 205 and 208 forms Length (A) which corresponds to a fiberscope of the greatest length, such as 3000 mm. The distance between points 205 and 207 forms Sub-Length (B) which corresponds to a fiberscope of a shorter length, such as 2000 mm. The distance between points 206 and 208 forms Sub-Length (C) which could also correspond to a fiberscope of the same length, 2000 mm, but also may correspond to a fiberscope of even shorter length, such as 1500 mm. A useable fiberscope length can also lie between points 205 and 206 (Sub-Length (D)), 206 and 207 (Sub-Length (E)), and 207 and 208 (Sub-Length (F)) of equal length, such as 1000 mm each. Alternative Sub-Lengths D-F can be unequal, such as 1500 mm for Sub-Length D, 500 mm for Sub-Length E, and 1000 mm for Sub-Length F. In sum, the length of the overall fiber bundle corresponds to a long fiberscope, while the lengths of identified sub-lengths within the overall bundle correspond to shorter fiberscopes of standardized lengths. While the examples described above discuss the use of a fiberscope bundle with sub-lengths that are all useable with fiberscopes of shorter lengths, it is also possible for only a portion of the sub-lengths to correspond to useable lengths. For instance, Lengths D and E may correspond to small fiberscopes while Length F may be an intermediate length or too small and does not correspond to a standardized fiberscope length.

At step 2(b), the fibers 201 are coated with an etchable material such as acid soluble glass 220 (2(b')) and baked (2(b")) so that fiber bundle 200 is rigid and the individual fibers 201 are thermally bonded together. At step 2(c), fiber bundle 200 is covered with an etchant resistant coating such as an acid resistant coating 230 in the vicinity of each point 205-208. As a result, fiber bundle 200 will comprise protected acid soluble glass 220 at each point 205-208 and the surrounding region and will comprise exposed acid soluble glass in the areas between the points. This forms a fiber bundle 200 with intermittent regions that are protected and exposed.

At step 2(d), the bundle is put into an etchant such as an acid bath to dissolve the glass 220 in the areas between the protected regions of points 205-208. After the acid soluble glass is dissolved, the bundle is removed from the acid solution and at step 2(e) the acid is cleaned by rinsing in water. At step 2(f), the acid resistant coating 230 is stripped away with a solvent and again rinsed with water, step 2(g). The result of this process is a fiber bundle 200 that comprises a plurality of Sub-Lengths (B-F) that combine, either concurrently, sequentially or a combination of the two, to form the overall Length (A) of the fiber bundle. The fiber bundle 200 further comprises rigid regions 220'-220"" of thermally bonded fibers about points 205-208 and coherently aligned fibers at each of the points 205-208. The fiber bundle 200 also comprises flexible regions 201'-201"" with independent individual fibers, i.e. non-thermally bonded fibers, between sequential points 205 and 206, 206 and 207, and 207 and 208.

At step 2(h), the image fiber bundle 200 is inspected for defects. Such inspection may consist of inspecting the overall fiber bundle 200, inspecting different Sub-Lengths (B-F), and/or inspecting each of the flexible regions 201'-201'" for broken fibers.

If no broken fibers are detected or an acceptable number of defects are detected over the entire Length (A) of the fiber bundle 200, two options may be pursued. First, at step (i), the entire fiber bundle 200 is integrated into a single fiberscope. Second, at step (j), the fiber bundle 200 can cut at one or more intermediate points 206, 207 so that it is be separated into Sub-Lengths (B-F) and integrated into fiberscopes of shorter lengths. For instance, fiber bundle 200 could be cut at intermediate point 206 to form Sub-Lengths (C) and (D) and each of these Sub-Lengths are integrated into individual fiberscopes. Alternatively, fiber bundle 200 could be cut at intermediate points 206 and 207 to form Sub-Lengths (D-F) with each Sub-Length (D-F) being integrated into a small fiberscope. Another option could exist in the context that Sub-Lengths (D) and (E) correspond to industry standardized fiberscope lengths while Sub-Length (F) does not. Fiber bundle 200 could be cut at intermediate points 206 and 207 to form Sub-Lengths (D-F) with Sub-Lengths (D) and (E) being integrated into small fibersopes while Sub-Length (F) is scrapped.

If an unacceptable number of broken fibers are detected in less than all of the Sub-Lengths (B-F), then at step (j) of the Sub-Lengths (B-F) that contain an unacceptable number of broken fibers, those sub-lengths are separated from fiber bundle 200 and scraped. The remaining sub-lengths that contain no-defects or an acceptable number of defects can then be integrated into fiberscopes. For instance, Sub-Length (F) could contain an unacceptable number of broken fibers. Yet, no defects are detected in Sub-Length (B). As a result, fiber bundle 200 is cut at point 207 separating Sub-Length (F) from Sub-Length (B). Sub-Length (B) is then be integrated into a shorter fiberscope. Or, Sub-Length (B) is further divided into Sub-Lengths (D) and (E), which are integrated into even shorter fiberscopes.

If an unacceptable number of broken fibers are detected over all Sub-Lengths (B-F) of bundle 200, then at step 2(h) the entire bundle 200 is scrapped.

The above described method and fiber bundle provides a way to be able to utilize a scrapped bundle that does not have defects over the entire length of the bundle, hence resulting in an increase in overall process yield and a decrease in scrap reduction. Overall, such a method and fiber bundle reduces the cost of manufacturing a fiberscope.

Although the invention has been described with reference to a particular arrangement of parts, features, steps and the like, these are not intended to exhaust all possible arrangements features, or steps, and indeed many modifications and variations will be ascertainable to those of skill in the art.

What is claimed is:

1. A method for manufacturing an image fiber bundle, comprising the steps of:
    aligning a plurality of image fibers into a bundle;
    bonding the plurality of image fibers in at least three regions to form an image fiber bundle with a proximal end and a distal end and at least three bonded regions and at least two flexible regions disposed between the bonded regions, the spacing of the at least three bonded regions forms a useable length and at least one useable sub-length shorter than the useable length and effective for use in fiberscopes;
    inspecting the image fiber bundle for defective image fibers;
    identifying at least one useable sub-length that comprises no more than a selected number of defects; and
    separating the at least one useable sub-length from the image fiber bundle.

2. The method of claim 1, wherein the useable length and the useable sub-length correspond to standardized lengths for fiberscopes.

3. The method of claim 1, wherein the plurality of image fibers are coherently aligned in the at least three bonded regions.

4. The method of claim 3, wherein the at least three bonded regions are rigid.

5. The method of claim 4, wherein the flexible regions comprise a plurality of independent image fibers that are not bonded.

6. The method of claim 1, wherein the step of bonding the plurality of image fibers comprises the step of bonding the plurality of image fibers with an etchable material along the entire length of the image fiber bundle.

7. The method of claim 6, wherein the step of bonding the plurality of image fibers with an etchable material comprises coating the plurality of image fibers with an acid soluble glass.

8. The method of claim 7, wherein the step of bonding the plurality of image fibers further comprises the step of coating the image fiber bundle in each of the at least three bonded regions with an etchant resistant coating.

9. The method of claim 8, wherein the etchant resistant coating is an acid resistant coating.

10. The method of claim 8, wherein the step of bonding the plurality of image fibers further comprises the step of applying an etchant to the image fiber bundle.

11. The method of claim 10, wherein the step of applying an etchant to the image fiber bundle forms the at least three bonded regions that are rigid and the flexible regions disposed between the at least three bonded regions.

12. The method of claim 11, wherein the plurality of image fibers are coherently aligned in the at least three bonded regions and not bonded in the flexible regions.

13. The method of claim 1, wherein the step of separating at least one useable sub-length comprises the step of cutting the image fiber bundle in at least one of the at least three bonded regions.

14. The method of claim 1, further comprising the step of constructing a fiberscope with the at least one useable sub-length.

15. The method of claim 1, wherein the at least one useable sub-length separated from the image fiber bundle comprises at least two smaller useable sub-lengths.

16. The method of claim 1, wherein the at least three bonded regions comprise the proximal end of the image fiber bundle, the distal end of the image fiber bundle, and an intermediate point disposed between the proximal end and the distal end.

17. The method of claim 16, wherein the intermediate point is at a distance from the proximal end such that the distance forms a useable sub-length between the proximal end and the intermediate point.

18. The method of claim 17, wherein the useable sub-length between the proximal end and the intermediate point corresponds to a standardized length for a fiberscope.

19. The method of claim 18, wherein the useable length from the proximal end to the distal end corresponds to a standardized length for a longer fiberscope.

20. The method of claim 19, wherein the intermediate point is also at a distance from the distal end such that the distance forms a useable sub-length between the distal end and the intermediate point.

21. The method of claim 20, wherein the useable sub-length between the distal end and the intermediate point corresponds to a standardized length for a fiberscope.

22. The method of claim 16, wherein the plurality of image fibers are coherently aligned at the proximal end, the distal end, and the intermediate point.

23. A method for manufacturing an image fiber bundle, comprising the steps of:
    aligning a plurality of image fibers into a bundle;
    bonding the plurality of image fibers in at least three regions to form an image fiber bundle with a useable length and at least one useable sub-length that is shorter than the useable length;
    inspecting the image fiber bundle for defective image fibers;
    identifying at least one useable sub-length that comprises no more than a selected number of defects; and
    separating the at least one useable sub-length having no more than the selected number of defects from the image fiber bundle.

24. The method of claim 23, further comprising the step of constructing a fiberscope with the at least one useable sub-length having no more than the selected number of defects.

* * * * *